(12) United States Patent
Webb

(10) Patent No.: US 10,488,503 B2
(45) Date of Patent: Nov. 26, 2019

(54) SURFACE MAPPING SYSTEMS AND METHODS USING DYNAMIC THRESHOLDS

(71) Applicant: FLIR Belgium BVBA, Meer (BE)

(72) Inventor: Philip Webb, Hampshire (GB)

(73) Assignee: FLIR BELGIUM BVBA, Meer (BE)

( * ) Notice: Subject to any disclaimer, the term of this patent is extended or adjusted under 35 U.S.C. 154(b) by 292 days.

(21) Appl. No.: 14/983,391

(22) Filed: Dec. 29, 2015

(65) Prior Publication Data

US 2016/0187474 A1 Jun. 30, 2016

Related U.S. Application Data

(60) Provisional application No. 62/099,062, filed on Dec. 31, 2014.

(51) Int. Cl.
| | |
|---|---|
| *G01S 7/00* | (2006.01) |
| *G01S 7/527* | (2006.01) |
| *G01S 15/10* | (2006.01) |
| *G01S 7/52* | (2006.01) |
| *G01S 15/89* | (2006.01) |
| *G01S 13/86* | (2006.01) |
| *G01S 15/02* | (2006.01) |

(52) U.S. Cl.
CPC ........ *G01S 7/5276* (2013.01); *G01S 7/52003* (2013.01); *G01S 7/527* (2013.01); *G01S 15/10* (2013.01); *G01S 15/89* (2013.01); *G01S 13/862* (2013.01); *G01S 15/025* (2013.01)

(58) Field of Classification Search
USPC ........................................................ 367/98
See application file for complete search history.

(56) References Cited

U.S. PATENT DOCUMENTS

| | | | | |
|---|---|---|---|---|
| 4,138,657 | A * | 2/1979 | Shave | G01S 15/18 367/91 |
| 6,335,905 | B1 * | 1/2002 | Kabel | G01S 7/527 367/98 |
| 7,542,376 | B1 * | 6/2009 | Thompson | G01S 15/89 367/104 |
| 8,305,840 | B2 * | 11/2012 | Maguire | G01S 15/89 367/88 |
| 8,514,658 | B2 * | 8/2013 | Maguire | G01S 15/89 367/88 |

(Continued)

FOREIGN PATENT DOCUMENTS

WO    WO-2016109592 A1 *  7/2016  ........... G01S 15/025

*Primary Examiner* — James R Hulka
(74) *Attorney, Agent, or Firm* — Haynes and Boone, LLP

(57) ABSTRACT

Techniques are disclosed for systems and methods to provide dynamic threshold sonar systems for mobile structures. A dynamic threshold sonar system may include sonar equipment configured to capturing sonar data by receiving and converting acoustic returns into arrays of time differentiated sonar data samples, and a processor communicatively coupled to the sonar receiver. The processor may be configured to receive the sonar data samples and determine noise characteristics of the sonar data. The processor may determine a threshold for surface detection based on the noise characteristics and detect a surface, and determine a distance to the surface, based on a comparison of the sonar data to the threshold that has been determined based on the same sonar data.

19 Claims, 7 Drawing Sheets

(56) References Cited

U.S. PATENT DOCUMENTS

| | | | |
|---|---|---|---|
| 8,605,550 B2* | 12/2013 | Maguire | G01S 15/89 |
| | | | 367/88 |
| 9,470,779 B2* | 10/2016 | Stokes | G01S 7/527 |
| 2013/0021876 A1* | 1/2013 | Maguire | G01S 15/89 |
| | | | 367/88 |
| 2014/0047182 A1* | 2/2014 | Kim | G06F 12/0802 |
| | | | 711/118 |
| 2014/0233355 A1* | 8/2014 | Stokes | B06B 1/0223 |
| | | | 367/87 |
| 2014/0286131 A1* | 9/2014 | Stokes | G01S 7/527 |
| | | | 367/87 |
| 2017/0299703 A1* | 10/2017 | Stokes | G01S 7/527 |

\* cited by examiner

SURFACE MAPPING SYSTEMS AND METHODS USING DYNAMIC THRESHOLDS

CROSS-REFERENCE TO RELATED APPLICATIONS

This application claims priority to and the benefit of U.S. Provisional Patent Application No. 62/099,062 filed Dec. 31, 2014 and entitled "SURFACE MAPPING SYSTEMS AND METHODS USING DYNAMIC THRESHOLDS", which is hereby incorporated herein by reference in its entirety.

This application is related to International Patent Application No. PCT/US2015/015279 filed Feb. 10, 2015 and entitled "MODULAR SONAR TRANSDUCER ASSEMBLY SYSTEMS AND METHODS", which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS", all of which are hereby incorporated herein by reference in their entirety.

This application is also related to International Patent Application No. PCT/US2015/032311 filed May 22, 2015 and entitled "TRANSMISSION SIGNAL SHAPING SYSTEMS AND METHODS", which claims priority to and the benefit of U.S. Provisional Patent Application 62/005,819 filed May 30, 2014 and entitled "TRANSMISSION SIGNAL SHAPING SYSTEMS AND METHODS", all of which are hereby incorporated herein by reference in their entirety.

This application is also related to International Patent Application No. PCT/US2015/032304 filed May 22, 2015 and entitled "MULTICHANNEL SONAR SYSTEMS AND METHODS", which also claims priority to and the benefit of U.S. Provisional Patent Application No. 62/005,838 filed May 30, 2014 and entitled "MULTICHANNEL SONAR SYSTEMS AND METHODS", all of which are hereby incorporated herein by reference in their entirety.

This application is also related to U.S. Provisional Patent Application No. 62/261,793 filed Dec. 1, 2015 and entitled "AUTONOMOUS SONAR SYSTEMS AND METHODS", which is hereby incorporated by reference in its entirety.

TECHNICAL FIELD

One or more embodiments of the invention relate generally to sonar systems and more particularly, for example, to systems and methods for mapping surfaces.

BACKGROUND

Sonar may be used to detect surfaces such as the bottom of a body of water in a bathymetry operation. For example, fishfinding sonar systems for watercraft often track the bottom so that the depth to which the fishfinding sounders ping can be controlled so that the bottom is always in range of the sounders. In some circumstances, conventional bottom finding systems can provide erroneous bottom detections such as in areas of increased noise in the sonar data. Thus, there is a need for improved surface detection sonar systems.

SUMMARY

Dynamic threshold sonar systems for surface detection from mobile structures are provided in accordance with one or more embodiments. A dynamic threshold sonar system may capture sonar data, generate a bottom return threshold based on noise characteristics of the captured sonar data, and detect a surface based on sonar data that exceeds the dynamically generated threshold.

According to an embodiment, a system may be provided that includes a sonar transducer assembly comprising a sonar transducer; a sonar receiver configured to receive acoustic returns from the sonar transducer and convert the acoustic returns into arrays of time differentiated sonar data samples; and a logic device adapted to communicate with the sonar receiver, where the logic device is configured to: receive the arrays of the time differentiated sonar data samples from the sonar receiver; determine at least one threshold based on noise characteristics of the sonar data samples; detect a portion of the sonar data samples having values that exceed the determined threshold; and determine a distance to a surface based on the detected portion of the sonar data samples.

According to another embodiment, a method of operating a sonar system may be provided, the method including: receiving sonar data samples from a sonar receiver; determining at least one threshold based on noise characteristics of the sonar data samples; detecting a portion of the sonar data samples having values that exceed the determined threshold; and determining a distance to a surface based on the detected portion of the sonar data samples.

According to another embodiment, a sonar system may be provided that includes: sonar equipment configured to capture sonar data; and a processor configured to determine a noise characteristic of the sonar data; determine a threshold based on the noise characteristic; accumulate a group of sonar data samples in the sonar data that each exceeds the determined threshold; and determine a distance to a surface from the sonar transducer based on a common distance of the group of sonar data samples.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
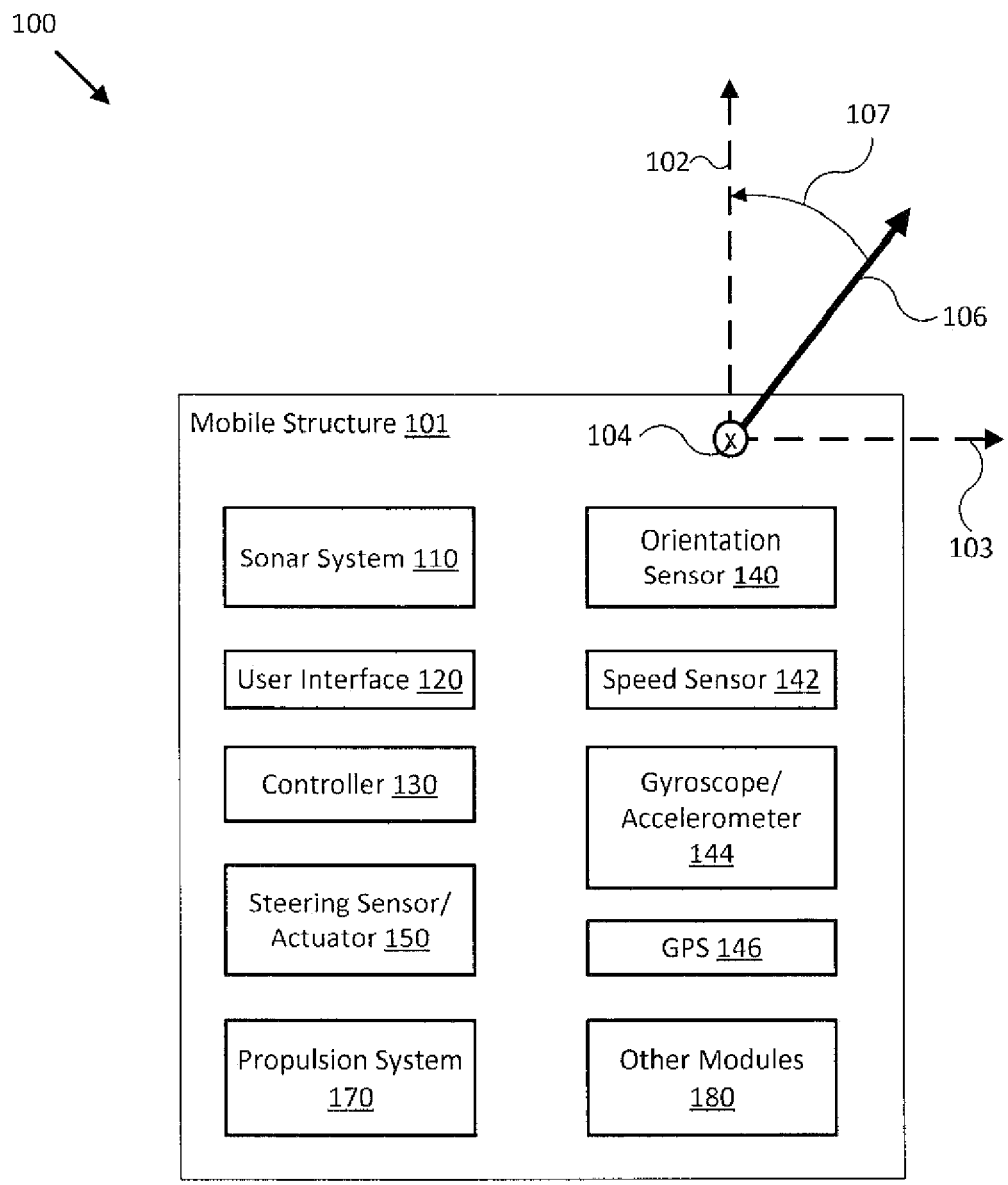
FIG. 1A illustrates a block diagram of a mobile structure including a dynamic threshold sonar system in accordance with an embodiment of the disclosure.

In accordance with various embodiments of the present disclosure, sonar systems and methods are provided for efficient and accurate surface detection such as bottom detection for watercraft. A sonar system may gather sonar data and, based on the sonar data, detect a surface. Surface detection operations may include dynamically generating a surface detection threshold based on the sonar data and comparing the sonar data to the threshold. By dynamically adjusting the threshold based on the sonar data, false detections may be prevented, particularly when the sonar data is relatively noisy and a noise spikes or other fluctuations in the data could otherwise trigger a false surface detection.

In one suitable embodiment that is sometimes discussed herein as an example, surface detection operations may include bottom detection operations for a watercraft in which a sonar signal is transmitted from the watercraft toward the bottom of the body of water in which the watercraft is suspended. Based on the time for the transmitted signal to be reflected from the bottom toward the watercraft and detected at the watercraft, along with the known speed of the sonar signals in the water, the depth of the bottom may be determined. In some situations, debris in the water, a rapidly changing bottom topography, or other environmental and/or system conditions can generate fluctuations in the sonar data and, if care is not taken, a fluctuation that is not caused by a reflected pulse from the bottom can be erroneously determined to indicate the bottom. This can be inconvenient or even dangerous depending on the type of watercraft and the use of the watercraft.

One or more embodiments of the described sonar systems may advantageously include a dynamic thresholding system that modifies a detection threshold based on the sonar data itself so that, when the data is noisy, the detection threshold is raised and when the data is relatively less noisy, the detection threshold is lowered. In this way, false detections can be avoided and the bottom depth can be more efficiently and accurately determined.

One or more embodiments of the described dynamic threshold sonar systems may advantageously include a window modification system that dynamically adjusts a search window within which the bottom is expected to be detected. The search window may be dynamically adjusted based on chart data for the location of the watercraft that indicates the expected depth and/or based on a previously detected bottom depth.

For example, the sonar system may detect the bottom at a particular depth, lock on that depth, and for subsequent bottom detection operations, search within a window surrounding that locked detection depth. As the bottom depth is repeatedly determined and as the confidence of each detection is determined, the size of the search window may be increased or decreased.

For example, when a strong bottom detection has been made (e.g., a detection that exceeds the detection threshold by 3, 4, 5, 7, 10 or more standard deviations of the data), a relatively narrow window centered on the depth for that detection may be used to search for the bottom in subsequent detection operations. If a relatively weak bottom detection is then made (e.g., a detection that exceeds the detection threshold by 1, 2 3, or less standard deviations of the data), a relatively wide window centered on the depth for that detection may be used to search for the bottom in a subsequent detection operations. If no detection is made, the window may continue to be widened up to a maximum width or until a detection is made (as examples). A strong bottom detection may also be a bottom detection that is in agreement (e.g., within a predetermined number of standard deviations) of a chart depth at the location of the watercraft.

One or more embodiments of the described sonar systems may advantageously include a controller and one or more sonar transducer assemblies in conjunction with an orientation sensor, gyroscope, an accelerometer, a position sensor, and/or a speed sensor providing measurements of an orientation, position, acceleration, and/or speed of the sonar transducer assemblies and/or a coupled mobile structure. For example, the sensors may be mounted to or within the mobile structure (e.g., a watercraft, aircraft, motor vehicle, and/or other mobile structure), or may be integrated with the sonar transducer assemblies and/or the controller. Various embodiments of the present disclosure may be configured to automatically coordinate sonar operation with various orientation and/or position measurements and/or chart data to produce relatively efficient and accurate bottom detection data.

Sonar data (e.g., bottom depth data), and/or imagery such as a topographical map of the bottom generated by a sonar transducer assembly may be transmitted to a user interface for display to a user. The user interface may in some embodiments be implemented as one or more dedicated displays, for example, such as a multi-function display (MFD). In other embodiments, the user interface may be implemented as a portable electronic device, for example, such as a tablet, laptop, smart phone, or other portable electronic device. In various embodiments, the sonar transducer assembly may be configured to communicate with user interfaces and/or other sonar transducer assemblies over a network, such as a wireless and/or wired network.

As an example, FIG. 1A illustrates a block diagram of system 100 in accordance with an embodiment of the disclosure. In various embodiments, system 100 may be adapted to provide sonar data that includes information regarding an environment about mobile structure 101 and/or sonar system 110. In some embodiments, system 100 may be adapted to measure the distance to a surface (e.g., the bottom or floor of a body of water in which mobile structure 101 is partially or completely immersed) from mobile structure 101 and/or sonar system 110. System 100 may use dynamically adjusted thresholds and search windows to detect the surface. In some embodiments, system 100 may be adapted to measure an orientation, a position, an acceleration, and a speed of mobile structure 101 and/or sonar system 110. System 100 may then use these measurements to form various views of sonar data provided by sonar equipment such as sonar system 110, to inform surface detection operations, and/or to adjust an orientation of sonar system 110 according to a desired operation of sonar system 110 and/or mobile structure 101. In some embodiments, system 100 may display resulting sonar data, depth data, and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data, surface detection data, and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, positioning circuitry such as a global positioning system (GPS) device 146 (e.g., for providing a current location of a mobile structure), a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101, towed behind mobile structure 101, separately piloted/autopiloted near mobile structure 101, and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., sonar equipment such as a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor (bottom) of a body of water.

In some embodiments, sonar system 110 may be implemented using a compact design, where multiple sonar transducers, sensors, and/or associated processing devices are located within a single transducer assembly housing that is configured to interface with the rest of system 100 through one or more wired and/or wireless communication protocols. In some embodiments, sonar system 110 may include orientation and/or position sensors configured to help provide two or three dimensional waypoints, increase sonar data and/or imagery quality, and/or provide highly accurate bathymetry data, as described herein.

For example, in the context of sea based sonar, fishermen often desire highly detailed and accurate information and/or imagery of underwater structures and mid water targets (e.g., fish). Embodiments of sonar system 110 provide a sonar system that can be configured to produce detailed two and three dimensional sonar data and/or imagery (e.g., using dynamically adjusted bottom detection thresholds and/or search windows). In some embodiments, sonar system 110 may be implemented with a sonar transducer assembly incorporating its own steering and propulsion system to provide roaming sonar imagery while mobile structure is relatively stationary.

In various embodiments, sonar system 110 may be configured to provide many different display views from a variety of selectable perspectives, including down imaging, side imaging, and/or three dimensional imaging, potentially using the same hardware but with different selectable configurations and/or processing methods, as described herein. In some embodiments, sonar system 110 may be implemented with a single transducer assembly housing/incorporating a single channel and/or multichannel transducer and associated electronics. Such embodiments can reduce overall system cost, for example, by reducing or eliminating a need for installation of shielded interface cabling. Such embodiments may also provide improved image quality by locating transmission and receiver electronics close to their corresponding transmission and receive transducer channels, which can dramatically improve signal to noise relative to systems that transmit and/or receive analog signals over long cabling.

In general, embodiments of sonar system 110 may be configured to transmit shaped acoustic beams using a single transmission channel/transducer and/or a single element of a multichannel transducer, receive similarly shaped acoustic returns using corresponding receive channels and/or elements, and to perform various processing operations (e.g., spatial correlation, beamforming, interferometry, and/or other signal processing) on the acoustic returns to produce high quality and/or enhanced two and/or three dimensional sonar data and/or imagery, as described herein. In some embodiments, one or more sonar transmitters of sonar system 110 may be configured to use chirp signals to improve range resolution and/or reduce ambiguities typically inherent in interferometry processing techniques.

In various embodiments, sonar system 110 may be configured to receive the acoustic returns, convert (e.g., using an analog to digital converter) each acoustic return to a time series array of time differentiated sonar data samples, and process (e.g., using one or more logic devices) the resulting arrays of time differentiated sonar data samples to enhance the sonar data samples, such as providing increased contrast in the sonar data samples through edge detection and enhancement, as described more fully herein. In related embodiments, such enhancement may be performed substantially without enhancing sonar artifacts (e.g., noise, surface clutter, interference, and/or other sonar artifacts) in the sonar data samples. For example, detection and/or filtering of sonar artifacts may remove or mitigate such artifacts before or after processing the sonar data samples for enhancement. The resulting arrays of enhanced sonar data samples may be used, along with other sensor data, to detect an acoustically reflective surface such the bottom of a body of water and to generate sonar imagery that includes the benefit of the sonar data sample enhancement at substantially all display resolutions.

In some embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. For instance, in some embodiments, the sonar data samples in two or more arrays of sonar data samples may be spatially and temporally aligned to each other based on their position in their respective arrays and the positions and/or orientations of the corresponding sonar transducer and/or assembly during the respective ensonifications. In other embodiments, an external orientation and/or position sensor can be used alone or in combination with an integrated sensor or sensors.

In embodiments where sonar system 110 is implemented with a position sensor, sonar system 110 may be configured to provide a variety of additional sonar data and/or imagery enhancements. For example, sonar system 110 may be configured to provide accurate positioning of waypoints (e.g., selected according to relative position to a feature in sonar imagery) remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a water bed or floor.

In embodiments where sonar system 110 is implemented with an orientation and/or position sensor, sonar system 110 may be configured to store such location/position information along with other sensor information (acoustic returns/sonar data samples, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate operation with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In another embodiment, controller 130 may be configured to determine water depth and/or altitude, and use such data to control an orientation of sonar system 110 to maintain an optimum orientation (e.g., depression angle) for the determined depths/altitudes. In yet another embodiment, a user may be searching for fish in a wide area and may select a configuration setting (e.g., transmission frequency, depression angle, sweep angle) that will adjust a transducer assembly configuration to ensonify a relatively broad, shallow area. In some embodiments, when the current location of the mobile structure is identified on the chart, a chart depth at that position may be used to inform bottom finding operations (e.g., to set the depth and width of an initial search window).

In still another embodiment, controller 130 may be configured to receive orientation measurements for mobile structure 101. In such embodiment, controller 130 may be configured to control the actuators associated with the transducer assembly to maintain its orientation relative to, for example, the water surface and/or gravitational down direction, and thus improve the depth measurements and/or displayed sonar images (e.g., by ensuring consistently oriented acoustic beams and/or proper registration of a series of acoustic returns). In various embodiments where sonar system 110 is coupled to mobile structure 101, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, which may also be integrated with sonar system 110.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or sonar system 110. In such embodiment, user interface 120 may be adapted to process the sensor signals to determine sensor information indicating an estimated and/or absolute roll, pitch, and/or yaw (attitude and/or rate), and/or a position or series of positions of mobile structure 101 or sonar system 110, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or sonar system 110. For example, user interface 120 may be adapted to display a time series of positions, headings, bottom depths, and/or orientations of mobile structure 101, and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame and/or other desired position and/or orientation. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
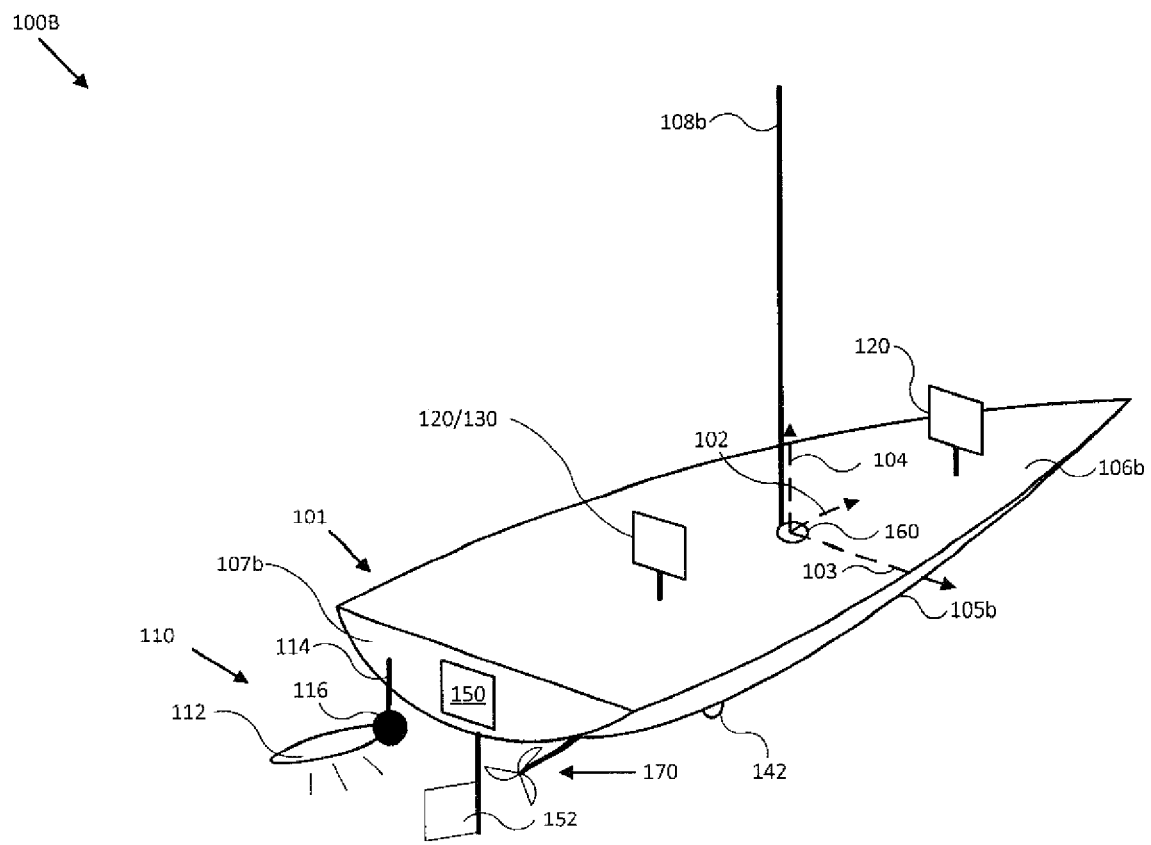
FIG. 1B illustrates a diagram of a watercraft including a dynamic threshold sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data (e.g., depth data), and/or imagery for use with operation of mobile structure 101, similar to system 100 of FIG. 1A. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such an embodiment, the underwater track may be predetermined, for example, or may be determined based on criteria parameters, such as a minimum allowable depth, a maximum ensonified depth, a bathymetric route, and/or other criteria parameters. In some embodiments, sonar system 110 may include no actuators and sonar transducer assembly 112 may be mounted directly to transom 107b using a conventional transom bracket. In other embodiments, sonar system 110 may include its own steering and/or propulsion system (e.g., similar to steering sensor/actuator 150, rudder 152, and/or propulsion system 170 of mobile structure 101) and be remotely controlled in an area relatively local to mobile structure 101, using user interfaces 120 for example, when detached from mobile structure 101.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
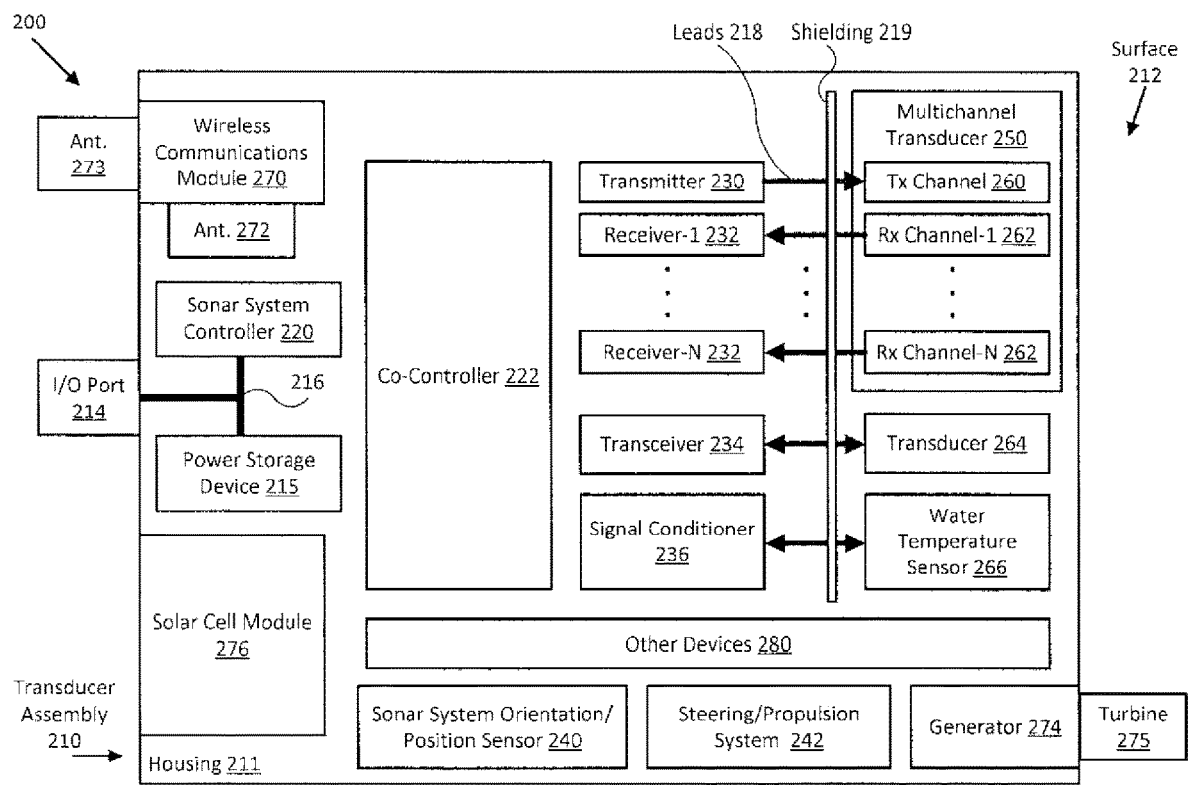
FIG. 2 illustrates a diagram of a sonar transducer assembly for a dynamic threshold sonar system in accordance with an embodiment of the disclosure.

FIG. 2 illustrates a diagram of a sonar system 200 in accordance with an embodiment of the disclosure. In the embodiment shown in FIG. 2, sonar system 200 includes a transducer assembly 210 that can be configured to communicate to a user interface (e.g., user interface 120 of FIG. 1A) using a wired connection/interface (e.g., I/O port 214 and leads 216) and/or a wireless communications module and/or one or more internal and/or external antennas (e.g., wireless communications module 270 and/or internal and/or external antennas 272/273).

As shown, transducer assembly 210 may include one or more controllers (e.g., sonar system controller 220 and/or co-controller 222), transducers (e.g., multichannel transducer 250 and/or transducer 264), other sensors (e.g., orientation/position sensor 240 and/or water temperature sensor 266), and/or other devices (e.g., power storage device 215, generator 274, turbine 275, and/or solar cell module 276—collectively a power system for transducer assembly 210) facilitating operation of system 200 all disposed within or coupled to a common housing 211. In some embodiments, one or more of the devices shown in FIG. 2 may be integrated with a remote user interface and communicate with remaining devices within transducer assembly 210 through one or more wired and/or wireless communication links.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transducer assembly 210 and/or system 200, for example, similar to controller 130. In typical embodiments, controller 220 may be tasked with overseeing general operation of transducer assembly 210, generating sonar imagery from sonar data, correlating sensor data with sonar data/imagery, performing surface detection operations such as bottom detection operations (e.g., using dynamic thresholding and window adjustment), communicating operational parameters and/or sensor information with other devices through wireless communication links supported by wireless communications module 270, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of transducer assembly 210, for example, and other time critical operations of system 200, such as per-sample digital enhancement, beamforming, and/or interferometry operations applied to sonar returns from multichannel transducer 250 and/or transducer 264, as described herein. In some embodiments, controller 220 and co-controller 222 may be integrated together, for example, or may be implemented in a distributed manner across a number of individual controllers/logic devices.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmission channel/transducer element of multichannel transducer 250 (e.g., transmission channel 260) to produce one or more acoustic beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

For example, in various embodiments, transmitter 230 may be implemented and/or operated according to any one or combination of the systems and methods described in U.S. Provisional Patent Application 62/005,819 filed May 30, 2014 and entitled "TRANSMISSION SIGNAL SHAPING SYSTEMS AND METHODS", which is hereby incorporated by reference in its entirety. In such embodiments, it can be advantageous to be able to control the overall shape of a transmission signal (e.g., a burst of signals). From a processing perspective, shaping the transmission signal can reduce the number and magnitude of artifacts that typically occur along the range direction of a sonar system, which improves the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of multichannel transducer 250 (e.g., receive channels 262), convert the analog acoustic returns into digital acoustic returns (e.g., arrays of time differentiated sonar data samples), and provide the digital acoustic returns/arrays of time differentiated sonar data samples to co-controller 222.

In some embodiments, operation of each receiver 232 (e.g., amplification, frequency dependent filtering, basebanding, sample resolution, duration, and/or timing/triggering, and/or other ADC/signal attributes) may be selected and/or controlled by co-controller 222. For example, co-controller 222 may be configured to use receivers 232 to convert an acoustic return into a digital acoustic return/array of time differentiated sonar data samples comprising one or more digital baseband transmissions that are then provided to co-controller 222. In some embodiments, receivers 232 may be configured to low-pass or otherwise filter, amplify, decimate, and/or otherwise process the acoustic and/or digital acoustic returns (e.g., using analog and/or digital signal processing) prior to providing the digital acoustic returns to co-controller 222. In other embodiments, receivers 232 may be configured to provide substantially unprocessed (e.g., raw) analog and/or digital acoustic returns to co-controller 222 for further signal processing, as described herein. In further embodiments, transmitter 230 and one or more of receivers 232 may be integrated into a single transceiver.

In the embodiment shown in FIG. 2, multichannel transducer 250 includes multiple transducer elements and/or transmission/receive channels that may be operated substantially independently of each other and be configured to emit acoustic beams and receive acoustic returns through emission surface 212 of housing 211. In some embodiments, multichannel transducer 250 may include a single transmission channel 260 and, separately, multiple receive channels 262. In other embodiments, multichannel transducer 250 may include multiple transmission channels. In further embodiments, transmission channel 260 may be implemented as both a transmission channel and a receive channel though use of a transceiver (e.g., similar to transceiver 234).

In general, transmission channel 260 may be implemented as one, two, or many separate transducer elements configured to produce one or more acoustic beams. Each of receive channels 262 may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the various channels of multichannel transducer 250 may be arranged to facilitate multichannel processing, such as beamforming, interferometry, inter-beam interpolation, and/or other types of multichannel processing used to produce sonar data and/or imagery.

For example, in one embodiment, multichannel transducer 250 may be implemented with multiple transmission channels 260 arranged in a phased array to allow electronic steering of relatively narrow acoustic beams (e.g., relative to those produced by a single transmission channel 260) within a relatively wide range of transmission angles. In such embodiments, transducer assembly 210 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, transducer assembly 210 may be implemented (alternatively, or additionally) with one or more single channel transducers (e.g., transducer 264) serviced by transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer 264 (e.g., and its constituent transducer elements) may be controlled by co-controller 222, similar to control of transmitter 230 and/or receivers 232 described herein.

In embodiments including multiple transducers, transceiver 234 and/or transducer 264 may be configured to produce acoustic beams adapted to reduce or eliminate interference with operation of another transducer (e.g., multichannel transducer 250), such as by using a substantially different transmission frequency, timing, and/or shape, and/or by aiming the acoustic beams in a substantially non-interfering direction. In alternative embodiments, transceiver 234 and/or transducer 264 may be configured to generate acoustic beams that produce acoustic returns in another transducer (e.g., multichannel transducer 250), similar to operation of transmitter 230 and transmission channel 260, but from an oblique angle relative to the other transducer (e.g., multichannel transducer 250). In such embodiments, the oblique acoustic returns may be used to generate sonar imagery with increased spatial differentiation and/or contrast between objects in the water column ensonified by transducer assembly 210. In some embodiments, one transducer within a transducer assembly may similarly be used in conjunction with other transducers in one or more other transducer assemblies distributed about mobile structure 101.

Transducer assembly 210 may include water temperature sensor 266, which may be a digital and/or analog thermometer, sound cell, and/or other analog or digital device configured to measure a temperature of water near emission surface 212 and provide a corresponding sensor signal to signal conditioner 236 and/or co-controller 222. For example, sound velocity and/or attenuation in water is at least partially dependent on water temperature, and so measured water temperatures may be used to determine accurate measurements of spatial displacements (e.g., depths, object dimensions, and/or other spatial displacements) ensonified by transducer assembly 210. Signal conditioner 236 may be one or more ADCs, filters, signal conditioning elements, amplifiers, timing circuitry, logic devices, and/or other digital and/or analog electronics configured to accept sensor signals from water temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222. Embodiments of signal conditioner 236 may also be implemented with other sensors and/or modules of transducer assembly 210.

In FIG. 2, each of multichannel transducer 250, transducer 262, and/or water temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer 250, transducer 264, and/or water temperature sensor 266.

As shown in FIG. 2, transducer assembly 210 may be implemented with sonar system orientation/position sensor 240. Orientation/position sensor 240 may be implemented as one or more orientation sensors, GPS sensors, differential GPS sensors, orientation/position reference transducers and/or optical sensors (e.g., for actuators), and/or other sensors configured to measure a relative and/or absolute orientation and/or position of transducer assembly 210, multichannel transducer 250, and/or transducer 264 and provide such measurements to controller 220 and/or co-controller 222. In some embodiments, controller 220 and/or co-controller 222 may be configured to combine sonar data and/or imagery according to such measurements and/or measurements of an orientation and/or position of a coupled mobile structure to produce combined sonar data and/or imagery, such as multiple temporally and spatially aligned arrays of sonar data samples, for example, or co-registered and/or three dimensional sonar images.

In other embodiments, controller 220 and/or co-controller 222 may be configured to use orientation and/or position measurements of transducer assembly 210 and/or a coupled mobile structure to control one or more actuators (e.g., other devices 280) to adjust a position and/or orientation of transducer assembly 210, multichannel transducer 250, and/or transducer 264 and ensonify a particular position and/or orientation beneath transducer assembly 210. As described herein, such orientation and/or position measurements may be stored with or otherwise correlated with sonar data and/or imagery.

In various embodiments, transducer assembly 210 may be implemented with a single housing 211 and/or with a single interface (e.g., I/O port 214) to simplify installation and use. For example, I/O port 214 may be implemented as a power-over-Ethernet (POE) cable interface supporting transmission of both communications and power between transducer assembly 210 and elements of a coupled mobile structure. Such communications and/or power may be delivered over leads 216 to power storage device 215 and/or controller 220. In some embodiments, I/O port 214 may be used to charge power storage device 215 before use, for example, to upload firmware, operating parameters, and/or other data, and/or to download stored data, such as when wireless communications module 270 is absent or inoperable and/or a wireless link to user interface 120 and/or controller 130 is not available. In other embodiments, I/O port 214 may be used to electrically couple an external power system (e.g., an externally mounted solar cell module, battery, turbine/generator, and/or other power generating or storage device) to components within housing 211 of transducer assembly 210.

Optional power storage device 215 may be implemented as one or more batteries, capacitors, power conditioners, line filters, switching power supplies, DC to DC converters, voltage regulators, and/or other power storage devices configured to receive power from I/O port 214 (e.g., over leads 216) and/or from generator 274 and/or solar cell module 276 and distribute power to the various other elements of transducer assembly 210. In some embodiments, power storage device 215 may be mounted within or onto housing 211 to help orient transducer assembly 211 relative to a surface of a body of water, for example, such as being mounted to housing 211 to orient surface 212 substantially down and submerge turbine 275 and/or either of transducers 250 and 264, or to help ensure solar cell module 276 is oriented substantially upward and/or positioned above the surface of the body of water.

Optional generator 274 and turbine 275 may be implemented as one or more mechanical power generating devices or modules configured to engage with a surrounding medium (e.g., water or air) and convert flow of that medium around transducer assembly 210 into electrical power that can be captured and/or stored in power storage device 215 and/or provided to various components within transducer assembly 210. In one embodiment, turbine 275 may be implemented as waterwheel, propeller, a weed shedding shaped turbine, and/or other turbine configured to convert flow of water around transducer assembly 210 into substantially rotational motion, which in turn may be converted into electrical power by generator 274. In another embodiment, turbine 275 may alternatively be configured with generator 274 to convert flow of air around transducer assembly 210 into electrical power. In various embodiments, generator 274 and turbine 275 may be mechanically coupled to each other (e.g., using a shaft protruding through housing 211 and sealed from the environment using one or more shaft seals) to transfer the motion of turbine 275 to generator 274 to generate power. In some embodiments, turbine 275 may be inductively coupled to generator 274 to eliminate a need for a shaft seal and/or hole through housing 211 of sonar transducer assembly 210. Collectively, in some embodiments, power storage device 215, generator 274, turbine 275, and/or solar cell module 276 (e.g., a power system for transducer module 210) may be configured to generate, store, and/or provide power solely for use by transducer assembly 210.

As shown in FIG. 2, transducer assembly 210 may in some embodiments be implemented with an optional steering/propulsion system 242 (e.g., similar to steering sensor/actuator 150 and/or propulsion system 170 of FIGS. 1A and 1B), which may be configured to orient and/or position transducer assembly 210 separate from assembly bracket/actuator 116 and/or mobile structure 101, such as if transducer assembly 210 is configured to be operated as a remote controlled and/or self-controlled autonomous sonar system, or if transducer assembly is configured to be towed behind mobile structure 101. In some embodiments, at least a portion of steering/propulsion system 242 may be implemented with generator 274 and/or turbine 275, for example, where those elements may be selectively configured for power generation or propulsion.

Optional wireless communications module 270 may be implemented as one or more amplifiers, modulators, phase adjusters, beamforming components, digital to analog converters (DACs), analog to digital converters (ADCs), various interfaces, and/or other analog and/or digital components configured to transmit and/or receive signals, for example, in order to facilitate wireless communications between controller 220 and user interface 120 of FIGS. 1A and/or 1B, using any of the wireless communication techniques and/or protocols described herein and/or other wireless communication techniques and/or protocols. As shown in FIG. 2, wireless communications module 270 may be implemented with and/or coupled to internal antenna 272 and/or external antenna 273 to facilitate wireless transmissions according to a particular radiation pattern and/or polarization.

In various embodiments, wireless communications module 270, antennas 272 and/or 273, and/or user interface 120 may be implemented using techniques described in International Application PCT/US14/13439 filed Jan. 28, 2014 and entitled POLARIZATION ALIGNMENT FOR WIRELESS NETWORKING SYSTEMS", which is hereby incorporated by reference herein. For example, in one embodiment, wireless communications module 270, antennas 272 and/or 273, and/or user interface 120 may be configured to transmit and/or receive wireless transmissions with substantially the same polarization alignment to help ensure reliable and low power wireless communications, as described herein. In some embodiments, external antenna 273 may be adjustably mounted to housing 211 to allow adjustment of a radiation pattern and/or polarization of corresponding wireless transmissions relative an orientation to housing 211. In other embodiments, internal antenna 272 may be configured to provide a fixed radiation pattern and/or polarization of wireless transmissions relative to an orientation of housing 211. In some embodiments, multiple antennas providing multiple polarized wireless transmissions may be incorporated into transducer assembly 210 to help provide reliable wireless communications regardless of an orientation of housing 211. Typically, a lateral or horizontal polarization may be preferred in embodiments where transducer assembly 210 is affixed to mobile structure 101, whereas a vertical polarization may be preferred in embodiments where transducer assembly 210 is detached from mobile structure 101 and/or configured to move about under its own motive system.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of transducer assembly 210. In some embodiments, other devices 280 may include a visible spectrum camera, an infrared camera, and/or other environmental sensors providing measurements and/or other sensor signals that can be displayed to a user (e.g., using user interface 120) and/or used by other devices of transducer assembly 210 (e.g., controller 220) to provide operational control of transducer assembly 210. In some embodiments, other devices 280 may include one or more actuators adapted to adjust an orientation (e.g., roll, pitch, and/or yaw) and/or a position (longitudinal, lateral, and/or vertical) of transducer assembly 210, multichannel transducer 250, and/or transducer 264, relative to a coupled mobile structure, in response to one or more control signals (e.g., provided by controller 220).

In other embodiments, other devices 280 may include one or more brackets, such as a transom bracket, adapted to couple housing 211 to mobile structure 101. In a particular embodiment, other devices 280 may include a quick release bracket and/or other type of retention mechanism configured to allow transducer assembly 210 to be attached and removed from mobile structure 101 without the use of a tool (e.g., using a latch mechanism or other hand actuated retention mechanism). For example, in some embodiments, other devices 280 may include a VELCRO® or suction based mounting and/or retention system, or a moulded cradle or dovetail mounting bracket (e.g., with or without a short safety line). Relatively flexible and/or soft retention systems may be configured to allow transducer assembly 210 to move or swing in response to a bottom strike to reduce risk of damage to mobile structure 101. In various embodiments, transducer assembly 210 may be moved from one mobile structure to another and/or detached from a mobile structure (e.g., for remote controlled and/or self-controlled/autopiloted use), during operation of the mobile structure or structures.

Other embodiments of transducer assembly 210 may include only one or a subset of the elements shown in FIG. 2, such as housing 111 and transducer 264 for example, where other elements are optionally omitted or integrated with one or more external devices (e.g., user interface/controller 120/130) and/or coupled to transducer assembly 210 through I/O port 214.

As noted herein, sonar data such as arrays of time differentiated sonar data samples will typically include some noise (e.g., fluctuations among data points due to system characteristics and/or environmental conditions). In order to reduce or even eliminate the effect of this noise on bathymetry operations and/or other surface detection operations, surface detection thresholds and/or search windows for surface detection operations such as bottom detection operations may be dynamically adjusted based on the sonar data itself.

For example, a processor such as controller 220 may receive sampled sonar data (e.g., a time series array of sonar data samples) representing a water column. The received sonar data may include data representative of return intensities over a full water column to be searched (e.g., a water column extending to a maximum search depth) as processed data. In order to detect a surface (e.g., the bottom or floor of a body of water), the processor may search the data for any returns with an amplitude (e.g., an intensity amplitude) over a threshold. Any return over the threshold may be classed as a possible bottom. The threshold may be dynamically generated based on the samples at the same time that the processor searches the samples for the bottom (e.g., for returns that exceed the dynamic threshold). The threshold may be determined using data in a particular depth window. For example, a plurality of depth windows, each covering a portion of the overall search window (e.g., an overall search window encompassing the entire search depth) may be used where each window covers a distance of X meters. The distance X may be 10 meters, 15 meters, 20 meters, 25 meters, 50 meters, 100 meters, 1000 meters, between 1 and 100 meters, between 10 and 500 meters, between 50 and 10000 meters, greater than 1 meter or less than 11000 meters (as examples).

Statistical characteristics such as noise characteristics of the data in each depth window may be used to determine the detection threshold for that window. For example, each data sample may include a value that represents the intensity of the return at a particular depth. In one embodiment, determining the statistical characteristics of the data includes determining a mean intensity value of the data in each depth window. A detection threshold for that window may be the determined mean (or other statistical value representative of the data in the window such as a median) multiplied by a factor n, where n is any suitable scalar value (e.g., a value of 3, 4, 5, 6, 10, or any other integer or non-integer value). The determined threshold for each window may be used as a threshold for comparison with every sample that falls within that window.

If a bottom is not detected in a particular window (e.g., if no data samples in that window exceed the threshold for that window), the processor may begin searching the next window by extracting a statistical measure (e.g., a mean) of the samples in that window, generating a threshold for that window, and comparing the samples in that window to the new threshold. The processor may continue searching depth windows until the bottom is detected. The depth of the bottom may be determined based on which data samples (e.g., the data samples at which depth) have the intensities that exceed the threshold.

Figure 3:
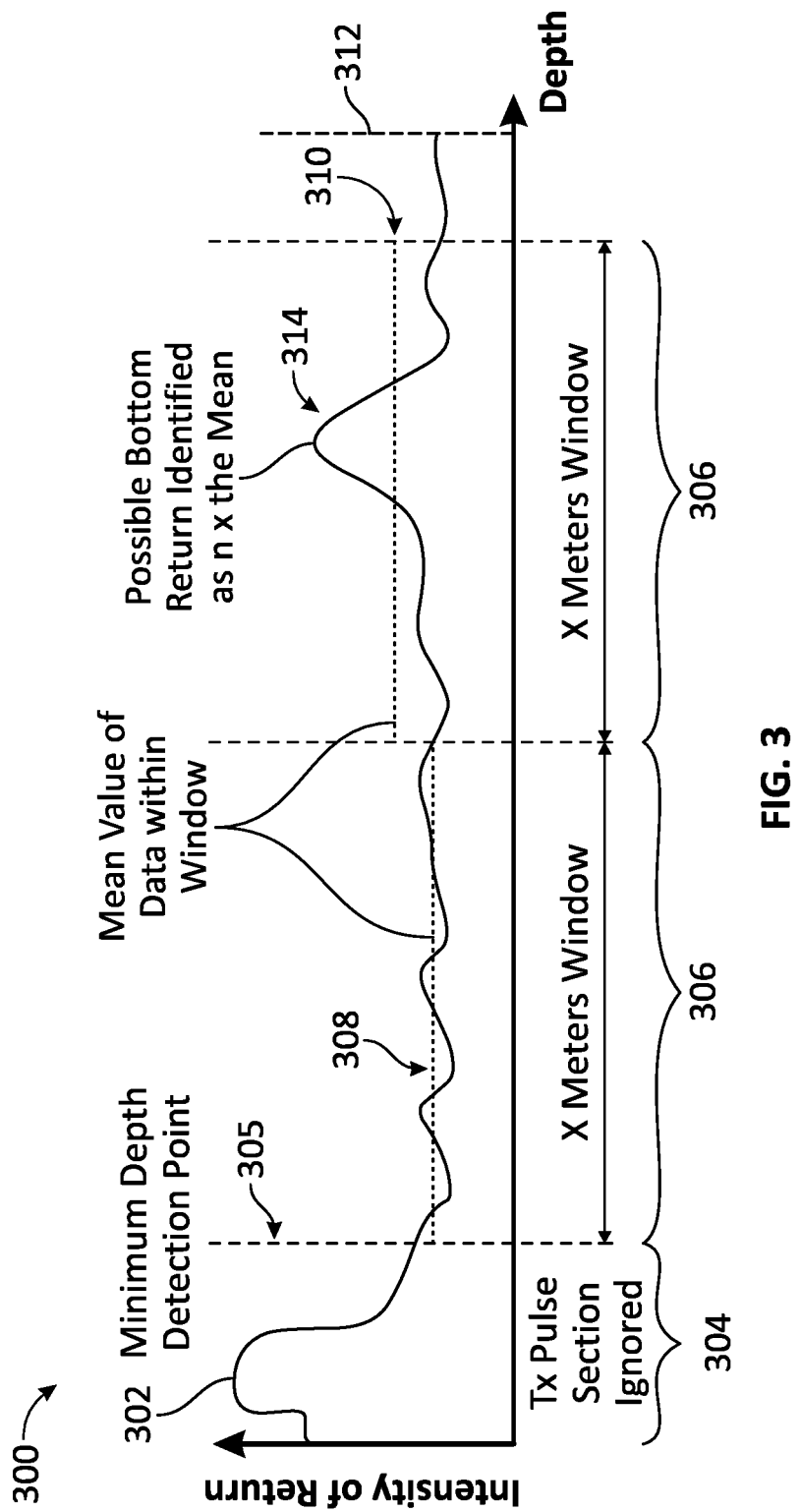
FIG. 3 illustrates sonar data and characteristics of the sonar data for generating dynamic thresholds based on the sonar data in accordance with embodiments of the disclosure.

FIG. 3 shows a graph 300 of an exemplary water column return according to an embodiment. As shown in FIG. 3, water column return 302 may include a main transmission (tx) pulse portion 304. Processor 220 may be configured to ignore tx pulse section 304 to the left of a minimum depth detection point 305. The minimum depth detection point 305 may represent a minimum depth at which the search for the bottom is begun and may be a predetermined (e.g., default or user-entered) depth or may be a dynamically determined minimum depth based on chart data and/or previous bottom detections.

As shown, the remaining portion of return 302 corresponding to the remaining portion of the water column to the end of the water column data at a maximum depth 312 may be split into sections such as depth windows 306. For each depth window 306, a threshold (e.g., a bottom detection return intensity threshold) may be generated based on a statistical measure such as the mean of the data in that window to aid the detection of the seabed.

The maximum depth 312 may represent a maximum depth at which the search for the bottom is ended and may be a predetermined (e.g., default or user entered) depth, may be dynamically determined depth based on chart data and/or previous bottom detections, or may be limited by the depth to which acoustic beams have been transmitted. As shown in FIG. 3, the mean for each window may be determined. For example a first mean 308 of a first depth window 306 may be determined. The threshold for that depth window may then be generated based on the first mean 308. In the example of FIG. 3, no portion of return 302 in the first window exceeds, for example, a (mean×n) threshold. A second mean 310 is then generated for a second, deeper depth window 306. In the example of FIG. 3, a possible bottom return portion 314 is identified that exceeds a threshold of, for example, n times the mean 310 for that window.

As the return 302 in each window 306 is analyzed, possible bottom return samples (e.g., samples that exceed the threshold) may be collated, values that fall within a common depth area (e.g., at a common distance from the transmitter/receiver) may be grouped together, and, as more possible detection samples in the common depth area are accumulated, the likelihood of a bottom detection may be increased. Once a group of samples accumulates enough samples to reach a predefined or dynamic limit, that group may then be classed as being a bottom detection. The depth of that detected bottom (e.g., the mean value of the depth or the depth of the peak value of the accumulated samples) may be stored and/or provided to a user and may also be used within the system. When the bottom is detected, a LOCK state for the search operations may be entered.

Once the LOCK state is entered, the processor 220 may reduce the size of the region within the water column that is searched in subsequent bottom detection operations to a region around the detected bottom depth onto which the system has locked. For example, at the beginning of a bottom detection process, the processor may search the entire water column from top to bottom. Once a LOCK state is entered, processor may begin to increase the minimum depth detection point 305. As the minimum depth detection point approaches the detected bottom depth, the end point (e.g., the maximum search depth) may be decreased so that the overall search window closes symmetrically around the detected bottom depth until a minimum window size is reached.

In some scenarios, no bottom may be detected in an overall window and the lock may be lost (e.g., the LOCK state may be canceled). If the lock is lost, then the overall window size may be increased (e.g., until the bottom is again detected and locked or until the overall window size reaches a maximum extending from the end of the tx pulse section to the end of the water column return).

Figure 4:
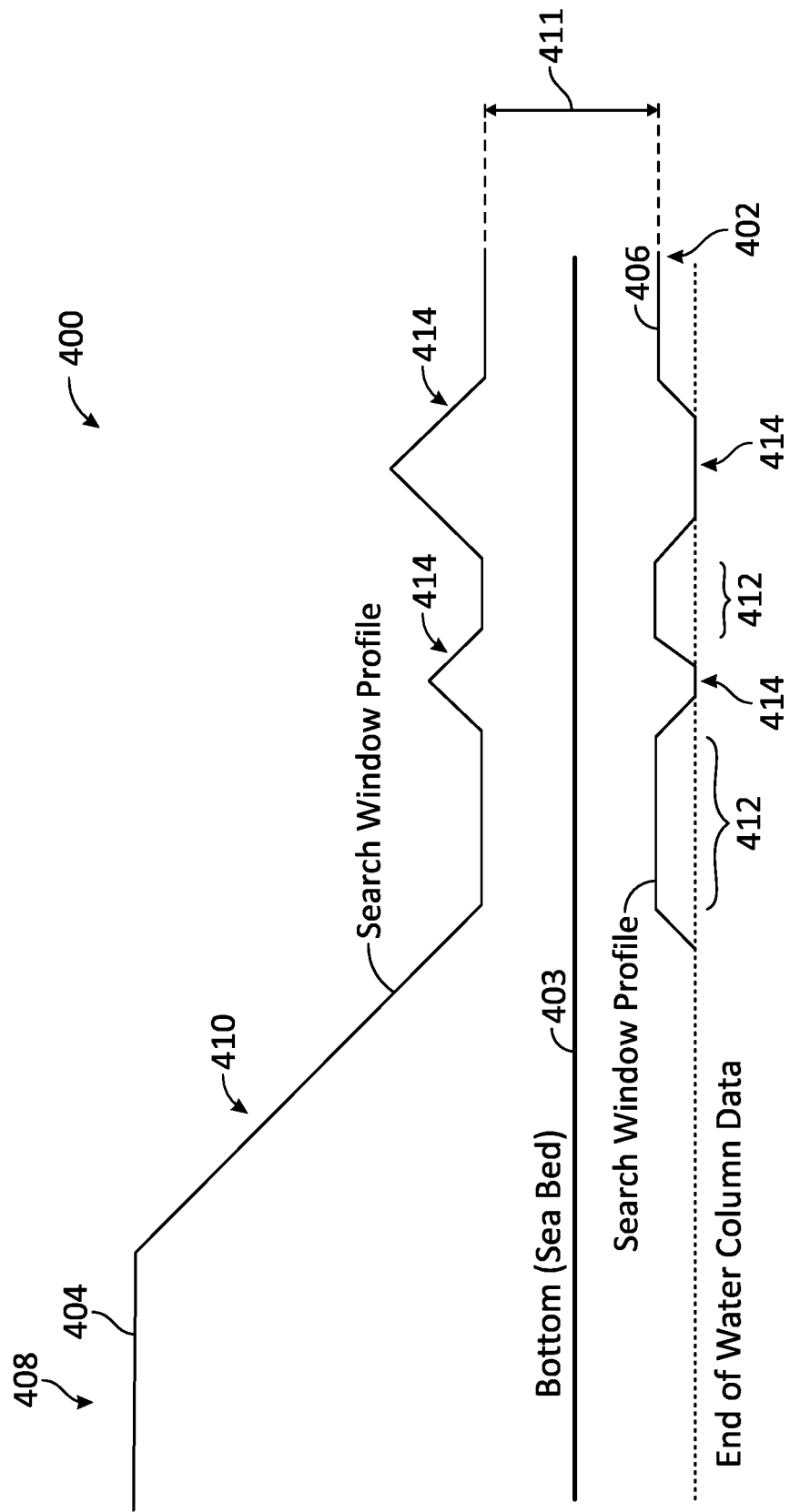
FIG. 4 illustrates a dynamically adjusted search window for surface detection in sonar data in accordance with embodiments of the disclosure.

FIG. 4 is diagram illustrating how the overall search window can open and close as the LOCK comes and goes (e.g., with the quality of the sea bed) according to an embodiment. As shown in FIG. 4, the overall search window 400 may be defined by search window profile that is bounded by a minimum search depth 404 and a maximum search depth 406 disposed on opposing sides of the bottom 403 (e.g., the sea bed). The minimum search depth 404 may have an absolute limit defined by the end of the tx pulse section 304 as in FIG. 3. The maximum search depth 406 may have an absolute limit 402 defined by the end of the water column data. The minimum search depth 404 may have an initial depth 408 at the absolute limit or at a depth determined based on a chart depth seed according to various embodiments.

As shown, the minimum search depth 404 may have an increasing portion 410 that approaches a detected bottom depth of bottom 403 during bottom finding operations. As the minimum search depth 404 increases and approaches bottom depth 403 (e.g., where the minimum search depth is substantially equidistant with the maximum search depth from the detected bottom depth), the maximum search depth 406 may decrease toward the detected (e.g., locked) bottom depth. In the LOCK state, the overall search window 400 decreases in size to a minimum width 411 (e.g., as shown in portions 412). During search operations, the LOCK may sometimes be lost and the search window size may be increased (e.g., as shown in portions 414 in which the maximum search depth increases toward a limit 402 and the minimum search depth 404 decreases) until the LOCK is regained and the search window size again decreases toward the minimum width 411. Minimum width 411 may, for example, be 1 meter, 0.5 meters, 5 meters, 10 meters, 50 meters, 100 meters, 500 meters, between 1 meter and 50 meters, between 1 meter and 10 meters, between 10 meters and 500 meters, less than one thousand meters, or greater than 0.1 meters (as examples).

In some embodiments, processor 220 may receive a chart depth seed at the start of a bottom finding operation that drives the search operations to the chart depth at which the search for the bottom in the sonar data is begun. For example, based on the GPS location of a mobile structure, a stored depth (e.g. a chart depth) at that location can be obtained and used as a seed to help start the search for the bottom.

Figure 5:
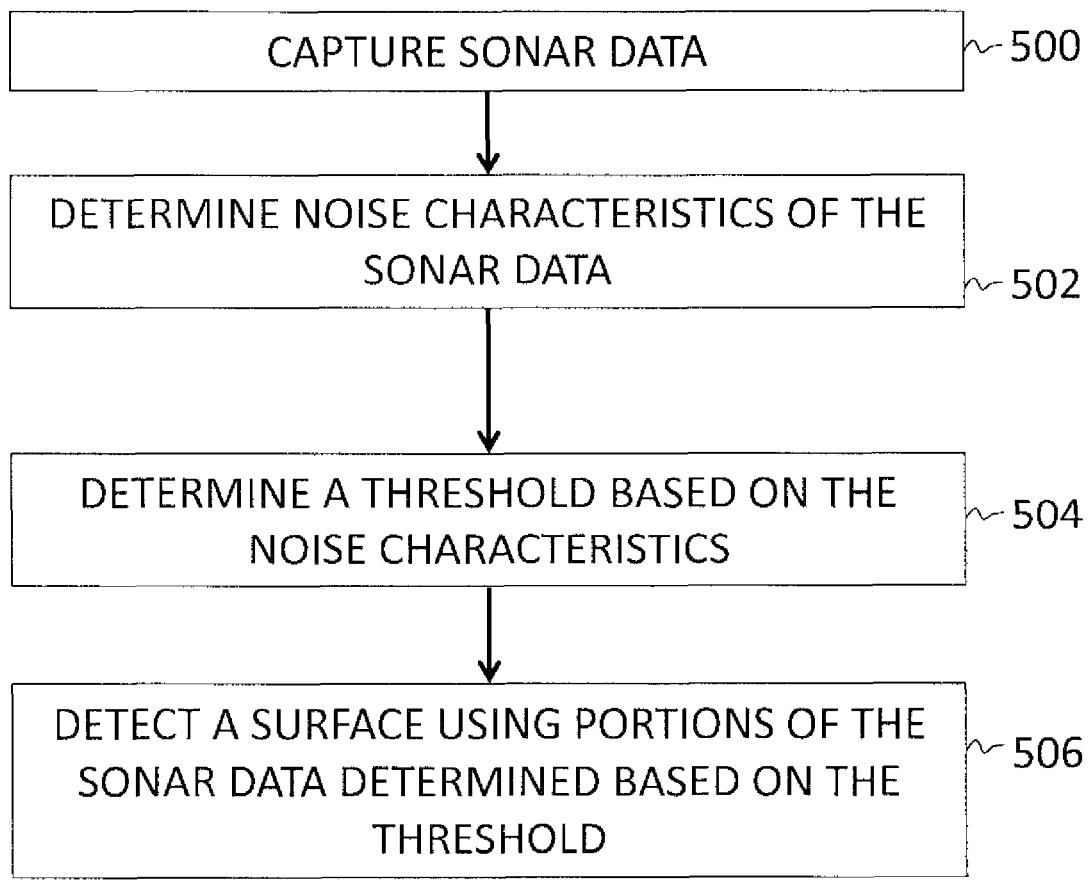
FIG. 5 illustrates a flow diagram of various operations to detect a surface using a dynamic threshold sonar system in accordance with an embodiment of the disclosure.

Illustrative operations that may be performed for sonar-based surface detection operations such as bottom finding operations are shown in FIG. 5.

At block 500, sonar data may be captured. Capturing sonar data may include operations as described above in connection with, for example, FIGS. 1, 2, and 3. For example, capturing sonar data may include, for example, controller 220 and/or co-controller 222 of transducer assembly 210 controlling transmitter 230 to provide a transmission signal to transmission channel 260 of multichannel transducer 250 to produce a corresponding acoustic beam. In some embodiments, controller 220 and/or co-controller 222 may be configured to control transceiver 234 to provide a transmission signal to transducer 264 and produce a corresponding acoustic beam. In various embodiments, transducer assembly 210 may be configured to use temperature sensor 266 and/or orientation/position sensor 240 to record corresponding measurements at substantially the same time. Notification of transmission and/or other sensor information may be relayed to other devices of system 100 through a wired or wireless communications link established through use of I/O port 214 and/or wireless communications module 270.

Capturing sonar data may also include a logic device or processor receiving sonar data samples from a receiver. For example, controller 220 and/or co-controller 222 may be configured to control one or more of receivers 232 to receive acoustic returns from one or more of receive channels 262 of multichannel transducer 250, for example, and provide corresponding arrays of time differentiated sonar data samples to controller 220. In other embodiments, controller 220 and/or co-controller 222 may be configured to control transceiver 234 to receive acoustic returns from transducer 264 and provide corresponding arrays of time differentiated sonar data samples to controller 220. In some embodiments, receivers 232 and/or transceiver 234 may be configured to convey the acoustic returns to co-controller 222 over a baseband channel and co-controller 222 may be configured to convert the acoustic returns into arrays of sonar data samples. In other embodiments, receivers 232, transceiver 234, and/or co-controller 222 may be configured to decimate the acoustic returns before performing further processing. In various embodiments, transducer assembly 210 may be configured to use temperature sensor 266 and/or orientation/position sensor 240 to record corresponding measurements at substantially the same time as each or any one of the time differentiated sonar data samples.

At block 502, statistical characteristics such as noise characteristics of the sonar data may be determined. Determining the noise characteristics may include determining a mean, median, standard deviation, interquartile range, and/or other statistical characteristics of the data. The statistical characteristics may be determined for each of several depth windows.

At block 504, a threshold such as a bottom detection threshold may be determined based on the noise characteristics. For example, the threshold may be equal to a number n multiplied by the mean or a number n multiplied by the standard deviation multiplied by the mean (as examples). The threshold may be determined for each of several depth windows based on the determined statistical characteristics for that window.

At block 506, a surface may be detected using portions of the sonar data determined based on the threshold. For example, the bottom or floor of a body of water may be detected based on one or more sonar data samples in a depth window having intensities that exceed the determined intensity threshold for that window. The one or more samples may include a number of accumulated or collated samples that each exceed the threshold where the number represents a limit for surface detection.

Figure 6:
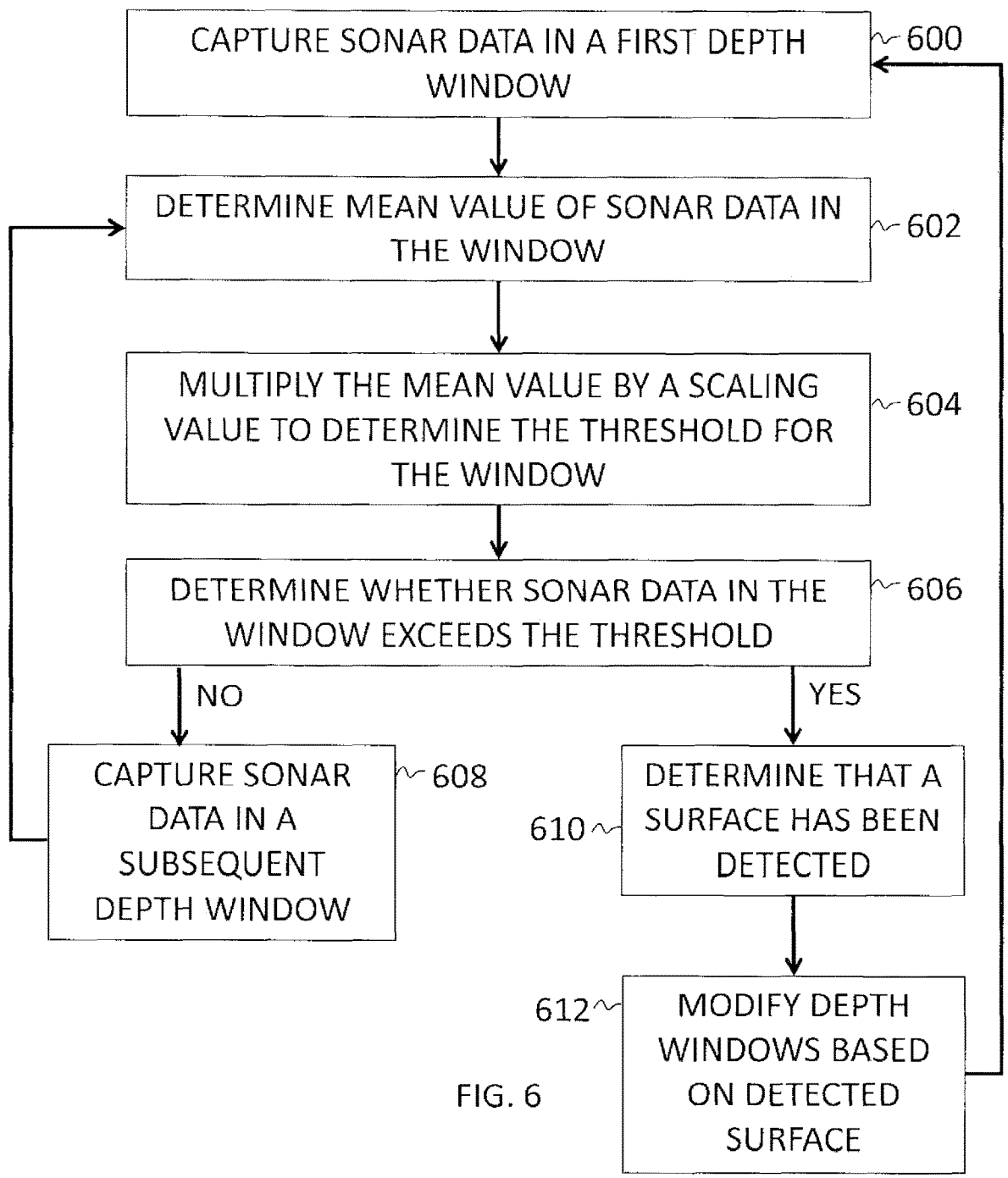
FIG. 6 illustrates a flow diagram of further details of various operations to detect a surface using a dynamic threshold sonar system in accordance with an embodiment of the disclosure.

Further details of operations for bottom detection using, for example, a sonar system such as system 100 of FIG. 1A are shown in FIG. 6, according to an embodiment.

At block 600, sonar data may be captured in a first depth window. The sonar data may include time differentiated arrays of sonar data samples as described, for example, above in connection with block 500 of FIG. 5. The first depth window may extend from a minimum depth detection point to a depth X meters beyond that point as discussed above in connection with FIG. 3.

At block 602, the mean value (e.g., the mean intensity value) of the sonar data in the window may be determined.

At block 604, the mean value may be multiplied by a scaling value to determine a threshold for that window. As discussed herein, the scaling value may be a multiplicative scalar value n, a multiple of a standard deviation of the intensities in the window or another suitable integer or non-integer scaling value.

At block 606, the sonar data samples within the window may be compared with the determined threshold. In this way, the system may determine whether any samples of the sonar data in the window exceed the threshold.

If it is determined that no samples of the sonar data in the window exceed the threshold, the system may proceed to block 608 at which sonar data in a subsequent depth window (e.g., a second depth window, etc.) may be captured. The subsequent depth window may extend from the maximum depth of the previous depth window to a depth, for example, X meters beyond that maximum depth. As shown in FIG. 6, following capture of the sonar data in the subsequent depth window, the system may return to block 602 at which the mean of the sonar data in the subsequent window may be determined. The system may then proceed through the operations of blocks 604 and 606. The system may repeat the operations of blocks 608, 602, 604, and 606 until sonar data is detected that exceeds a threshold in a given window or until a maximum depth of the water column data is reached. If no bottom is detected within an overall search window that is narrower than the total water column, the width of the overall search window may be increased. If no bottom is detected when the maximum depth of the water column in reached, the system may take suitable action to increase the maximum depth such as narrowing the transmitted acoustic beams so that the sonar data reaches a deeper depth. Although the examples described herein include depth windows of equal size, this is merely illustrative. It should be appreciated that windows of different sizes may also be used.

When, at block 606, sonar data in a particular depth window (e.g., the first depth window, a second depth window, a third depth window, etc.) that exceeds the threshold for that window is detected, the system may proceed to block 610 at which it may be determined that a surface such as the sea bed or other bottom surface of a water body has been detected. Determining that the surface has been detected may include collating a minimum number of samples that exceed the threshold.

At block 612, one or more depth windows may be modified based on the detected surface. For example, one or more depth windows that are spatially distant from the detected bottom depth may be eliminated from a subsequent bottom detection operation. In another example, the overall search window size may be reduced to a relatively smaller width surrounding the detected bottom depth. In another example, the number of depth windows and/or the size of the depth windows within the overall search window may be decreased so that the search area is disposed about the detected bottom depth as described, for example, above in connection with FIG. 4.

As shown in FIG. 6, following modification of the depth windows, the system may return to block 600 at which a new bottom detection operation is begun. It should be appreciated that the modification of the depth windows at block 612 is optional and can be skipped or eliminated in some embodiments. When the system returns to block 600, the new bottom detection operation may be informed by the previously detected bottom depth (e.g., the overall search window size, the size and/or number of depth windows, the minimum search depth, and/or the maximum search depth may be adjusted based on the known depth detected during the previous bottom detection operations).

In various embodiments, a sonar data sample enhancement algorithm may be performed after or during other analog and/or digital sonar data sample processing, including analog to digital conversion (e.g., performed by receivers 232 and/or transceiver 234 and/or co-controller 222) and before bottom detection and/or image generation processes (e.g., performed by controller 220 and/or user interface/controller 120/130). For example, transmitter 230 and/or transceiver 234 may provide transmission signals to corresponding transducers/channels 260 and/or 264 to generate one or more acoustic beams, and receivers 232 and/or transceiver 234 may receive corresponding acoustic returns from transducers/channels 260 and/or 264, which are then processed (e.g., low-pass or otherwise filtered, amplified, basebanded, decimated, multichannel processed, and/or otherwise processed using analog and/or digital signal processing) and/or converted by receivers 232 and/or transceiver 234 and/or co-controller 222 to produce an array of time differentiated sonar data samples for each acoustic return and/or channel/transducer.

In some embodiments, the sonar data samples may be time differentiated (e.g., sampled at a series of sample times) relative to a transmission time of a corresponding acoustic beam, which may or may not incorporate a known delay from the transmission time to account for, for example, transmission pulse length, system recovery, and/or other sources of sonar interference. The series of sample times may in some embodiments be equally spaced from one another, for example, or may be spaced differently according to one or more desired system resolutions at one or more ranges of depths, for example.

In various embodiments, the output of receivers 232 and/or transceiver 234 and/or co-controller 222 may include an array of time differentiated sonar data samples representing the amplitudes of acoustic returns corresponding to a single acoustic beam or transmission signal, for example, or a plurality of acoustic beams if averaging between transmissions is performed to reduce the effective background noise level in the array of sonar data samples. The format of the sonar data samples may provide such amplitudes on a linear or logarithmic scale (e.g., in linear or logarithmic units).

In some embodiments, receivers 232 and/or transceiver 234 may be configured to provide the arrays of time differentiated sonar data samples to co-controller 222, which may be configured to process the arrays to enhance the sonar data samples, as described herein. In other embodiments, co-controller 222 may be configured to receive analog signals from receivers 232 and/or transceiver 234 corresponding to received acoustic returns, convert the analog signals into the arrays of time differentiated sonar data samples, and process the arrays to enhance the sonar data samples. In various embodiments, co-controller 222 may be configured to provide the enhanced arrays of time differentiated sonar data samples to controller 220, which may be configured to perform surface detection operations such as bottom detection operations as described herein, to generate sonar image data and/or one or more sonar images from the enhanced arrays or to convey the enhanced arrays to user interface 120 and/or controller 130 for conversion to one or more sonar images and/or rendering on a display of user interface 120 for display to a user.

Embodiments of the present disclosure can thus provide efficient and accurate sonar systems, data and/or imagery. Such embodiments may be used to provide sonar data to assist in navigation and/or mapping for a mobile structure, object detection such as fishfinding operations, and/or to assist in the operation of other systems, devices, and/or sensors coupled to or associated with the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
 a sonar transducer assembly comprising a sonar transducer;
 a sonar receiver configured to receive acoustic returns from the sonar transducer and convert the acoustic returns into arrays of time differentiated sonar data samples; and
 a logic device adapted to communicate with the sonar receiver, wherein the logic device is configured to:
  receive the arrays of the time differentiated sonar data samples from the sonar receiver;
  divide a search area into a plurality of depth windows; and
  successively search each of the plurality of depth windows until a surface is detected;
 wherein for each successive search, the logic device is further configured to:
  select one of the plurality of depth windows to be searched;
  dynamically determine a threshold based on noise characteristics of the sonar data samples within the selected one of the plurality of depth windows;
  detect whether the surface is present in the selected one of the depth windows based, at least in part, on a portion of the sonar data samples within the selected one of the plurality of depth windows having values that exceed the determined threshold for the selected one of the plurality of depth windows; and
  determine a distance to the detected surface based on the detected portion of the sonar data samples.

2. The system of claim 1, wherein the surface comprises a bottom of a body of water and wherein the distance comprises a depth of the bottom.

3. The system of claim 1, wherein the noise characteristics for the selected one of the plurality of depth windows comprises a mean of the sonar data samples within the first depth window.

4. The system of claim 3, wherein the at least one threshold for the first depth window comprises a scaling factor multiplied by the mean.

5. The system of claim 1, wherein the at least one threshold comprises a first threshold based on samples within the first of the plurality of depth windows that extends to a first depth.

6. The system of claim 5, wherein the at least one threshold comprises a second threshold based on samples within a second of the plurality of depth windows that extends beyond the first depth.

7. The system of claim 5, wherein the first depth window extends to the first depth from a minimum depth detection point that is beyond a transmission pulse portion of the acoustic returns.

8. The system of claim 1, further comprising:
 positioning circuitry configured to provide a current location; and
 memory configured to store chart depths at various locations;
 wherein the logic device is configured to:
  receive the current location;
  obtain a selected one of the chart depths at the current location from the stored chart depths; and
  determine a minimum search depth based on the chart depth.

9. The system of claim 1, wherein the logic device is configured to enter a lock state based on the determined distance to the surface and to reduce an overall search window size based on the determined distance to the surface.

10. The system of claim 9, wherein the logic device is further configured to increase the overall search window size responsive to a loss of the lock state.

11. The system of claim 9, wherein the logic device is configured to reduce the overall search window size by increasing a minimum search depth.

12. The system of claim 11, wherein the logic device is configured to reduce the overall search window size by, after increasing minimum search depth, decreasing a maximum search depth.

13. The system of claim 1, wherein the logic device is configured to detect the portion of the sonar data samples having values that exceed the determined threshold for the first of the plurality of depth windows by collating candidate samples that exceed the threshold.

14. The system of claim 13, wherein the logic device is configured to determine the depth by determining that a group of the collated candidate samples at a particular depth corresponding to the determined depth all exceed the threshold.

15. The system of claim 1, wherein:
the sonar transducer assembly comprises an orientation and/or position sensor (OPS) disposed within the sonar transducer assembly; and
the logic device is configured to process the received arrays based, at least in part, on orientation and/or position measurements provided by the OPS.

16. A watercraft comprising the system of claim 1.

17. A method of operating a sonar system, the method comprising:
receiving sonar data samples from a sonar receiver;
dividing a search area into a plurality of depth windows; and
successively searching each of the plurality of depth windows until a surface is detected by a process comprising:
dynamically determining a threshold based on the noise characteristics of the sonar data samples for a selected one of a plurality of depth windows;
detecting the surface based, at least in part, on a portion of the sonar data samples within the selected one of the plurality of depth windows having values that exceed the determined threshold; and
determining a distance to the detected surface based on the detected portion of the sonar data samples.

18. A sonar system comprising:
sonar equipment configured to capture sonar data; and
a processor communicatively coupled to the sonar equipment, wherein the processor is configured to:
determine a noise characteristic of the sonar data for a first of a plurality of depth windows;
determine a threshold based on the noise characteristic for the first of the plurality of depth windows;
accumulate a group of sonar data samples in the sonar data for the first of the plurality of depth windows, wherein each of the group of sonar data samples exceeds the determined threshold; and
determine a distance to a surface based on a common distance of the group of sonar data samples.

19. The sonar system of claim 18, wherein the noise characteristic comprises a mean of the sonar data, the surface comprises a bottom of a body of water, the group of sonar data samples comprises a group of samples at a common depth, and the distance to the surface comprises the common depth.

* * * * *